US009076429B2

(12) United States Patent
Islam et al.

(10) Patent No.: US 9,076,429 B2
(45) Date of Patent: Jul. 7, 2015

(54) ACOUSTIC METAMATERIALS

(75) Inventors: Tofiqul Islam, Rochester Hills, MI (US); Golam Newaz, Ann Arbor, MI (US); Mohammad Hailat, Dearborn, MI (US)

(73) Assignee: WAYNE STATE UNIVERSITY, Detroit, MI (US)

( * ) Notice: Subject to any disclaimer, the term of this patent is extended or adjusted under 35 U.S.C. 154(b) by 55 days.

(21) Appl. No.: 13/982,929

(22) PCT Filed: Jan. 31, 2012

(86) PCT No.: PCT/US2012/023305
§ 371 (c)(1), (2), (4) Date: Oct. 9, 2013

(87) PCT Pub. No.: WO2012/106327
PCT Pub. Date: Aug. 9, 2012

(65) Prior Publication Data

US 2014/0027201 A1 Jan. 30, 2014

Related U.S. Application Data

(60) Provisional application No. 61/437,927, filed on Jan. 31, 2011.

(51) Int. Cl.
*G10K 11/172* (2006.01)
*F16F 7/10* (2006.01)

(52) U.S. Cl.
CPC .................................... *G10K 11/172* (2013.01)

(58) Field of Classification Search
CPC ........... F16F 7/10; F16F 7/1028; F16F 7/104; F16F 7/108; F16F 7/112; F16F 7/116; G10K 11/16; G10K 11/165; G10K 11/172
USPC .......................... 181/294, 288, 295, 207–209
See application file for complete search history.

(56) References Cited

U.S. PATENT DOCUMENTS 2,541,159 A * 2/1951 Geiger .......................... 181/208
3,515,910 A * 6/1970 Whitehouse et al. ......... 310/326
4,120,382 A 10/1978 Bschorr
4,736,701 A * 4/1988 Kondo et al. ................. 114/340
(Continued)

FOREIGN PATENT DOCUMENTS

DE 102004020605 A1 * 11/2005 ............. F16F 15/04
EP 2544177 A2 * 1/2013

OTHER PUBLICATIONS

Ambati, M., Fang, N., Sun, C. and Zhang, X., "Surface resonant states and superlensing in acoustic metamaterials", *Physical Review B*, vol. 75 (195447), pp. 1-5, (2007).
(Continued)

*Primary Examiner* — Edgardo San Martin
(74) *Attorney, Agent, or Firm* — Brinks Gilson & Lione

(57) ABSTRACT

Metamaterial members for absorbing sound and pressure, and modular systems built of metamaterial members are provided. The metamaterial member includes an outer mass. The outer mass can have a cavity formed therein in which a stem coupled to an inner mass is disposed, or the outer mass can be solid and contain an inner mass embedded therein. The inner mass can include an inner core and an outer shell. Multiple metamaterial members can be attached to form a modular system for absorption of sound and pressure.

26 Claims, 9 Drawing Sheets

(56) References Cited

U.S. PATENT DOCUMENTS

| | | | | |
|---|---|---|---|---|
| 5,400,296 | A * | 3/1995 | Cushman et al. | 367/1 |
| 5,583,324 | A | 12/1996 | Thomasen | |
| 7,249,653 | B2 * | 7/2007 | Sheng et al. | 181/290 |
| 7,395,898 | B2 * | 7/2008 | Yang et al. | 181/286 |
| 7,474,823 | B2 * | 1/2009 | Wang et al. | 385/37 |
| 7,837,008 | B1 * | 11/2010 | Lane et al. | 181/284 |
| 8,579,073 | B2 * | 11/2013 | Sheng et al. | 181/207 |
| 8,616,330 | B1 * | 12/2013 | McKnight et al. | 181/207 |
| 8,857,563 | B1 * | 10/2014 | Chang et al. | 181/286 |
| 8,857,564 | B2 * | 10/2014 | Ma et al. | 181/286 |
| 8,876,091 | B2 * | 11/2014 | Manfredotti et al. | 267/136 |
| 2002/0030315 | A1 * | 3/2002 | Kato et al. | 267/141 |
| 2005/0191774 | A1 * | 9/2005 | Li et al. | 438/22 |
| 2011/0240402 | A1 * | 10/2011 | Chou et al. | 181/207 |
| 2012/0061176 | A1 * | 3/2012 | Tanielian | 181/207 |
| 2013/0025961 | A1 * | 1/2013 | Koh et al. | 181/207 |
| 2013/0087407 | A1 * | 4/2013 | McKnight et al. | 181/287 |

OTHER PUBLICATIONS

Cantrell, R.H. and Hart, R.W., "Interaction Between Sound and Flow in Acoustic Cavities: Mass, Momentum, and Energy Considerations," *J. Acoust. Soc. Am.*, vol. 36 (4), p. 697-706, (Apr. 1964).

Chen, H. and Chan, C. T., "Acoustic cloaking in three dimensions using acoustic metamaterials", *Applied Physics Letters*, vol. 91, (2007).

Ding, C., Hao, L., and Zhao, Z., "Two-dimensional acoustic metamaterial with negative modulus," *Journal of Applied Physics*, 108 (pp. 074911-074911-5), (2010).

Espinosa, F. R. M., Jimenez, E. and Torres, M., "Ultrasonic Band Gap in a Periodic Two-Dimensional Composite", Physical Review Letters, vol. 80(6), pp. 1208-1211, 9 (Feb. 1998).

Esteve, S. J. and Johnson, M. E., "Reduction of sound transmission into a circular cylindrical shell using distributed vibration absorbers and Helmholtz resonators", *J. Acoust. Soc. Am.*, vol. 112 (6), pp. 2840-2848, (Dec. 2002).

Fang, N., Xi, D., Xu, J., Ambati, M, Srituravanich, W., Sun, C. and Zhang, X., "Ultrasonic metamaterials with negative modulus", *nature materials*, vol. 5, pp. 452-456, (Jun. 2006).

Genov, D. A., Zhang, S. and Zhang, X., "Mimicking celestial mechanics in metamaterials", *nature physics*, (Jul. 20, 2009).

Hepberger, A., Pluymers, B., Jalics, K., Priebsch, H. H. and Desmet, W., "Validation of a wave based technique for the analysis of a multi-domain 3D acoustic cavity with interior damping and loudspeaker excitation", *33rd Intl. Congress and Exposition on Noise Control Engineering*, (Aug. 22-25, 2004).

Hu, J., Zhou, X. and Hu, G., "A numerical method for designing acoustic cloak with arbitrary shapes", *Computational Materials Science*, (2009).

Huang, H. H., Sun, C. T. and Huang, G. L., "On the negative effective mass density in acoustic metamaterials", *Intl. J. Engineering Science*, vol. 47, pp. 610-617, (2009).

Kung, C.-H. and Singh, R., "Experimental modal analysis technique for three dimensional acoustic cavities", *J. Acoust. Soc. Am.*, vol. 77 (2), pp. 731-738, (Feb. 1985).

Li, H., Hang, Z., Qin, Y., Wei, Z., Zhou, L., Zhang, Y., Chen, H. and Chan, C. T., "Quasi-periodic planar metamaterial substrates", *Applied Physics Letters*, vol. 86, (2005).

Li, H., Hao, J., Zhou, L., Wei, Z., Gong, L., Chen, H. and Chan, C. T., "All-dimensional subwavelength cavities made with metamaterials", *Applied Physics Letters*, vol. 89, (2006).

Soize, C., "Reduced models for structures in the medium-frequency range coupled with internal acoustic cavities", *J. Acoust. Soc. Am.*, vol. 106 (6), pp. 3362-3374, (Dec. 1999).

Sugimoto, N. and Horioka, T., "Dispersion characteristics of sound waves in a tunnel with an array of Helmholtz resonators", *J. Acoust. Soc. Am.*, vol. 97(3), pp. 1446-1459, (Mar. 1995).

Wang, X. and Bathe, K. J., "Displacement/pressure based mixed finite element formulations for acoustic fluid-structure interaction problems", *Intl. J. Num. Meth. Eng.*, vol. 40, pp. 2001-2017, (1997).

Wu, L., Chen, L. and Liu, C., "Acoustic pressure in cavity of variously sized two-dimensional sonic crystals with various filling fractions", *Physics Letters A*, vol. 373, pp. 1189-1195, 2009.

Wu, L., Chen, L. and Liu, C., "Experimental investigation of the acoustic pressure in cavity of a two-dimensional sonic crystal", *Physica B*, vol. 404, pp. 1766-1770, (2009).

Zhang, S., Yin, L. and Fang, N., "Focusing Ultrasound with Acoustic Metamaterial Network", *PACS* Nos. 43.20.

* cited by examiner

18

18

18

18

18

18

18

18

18

18

18

ACOUSTIC METAMATERIALS

CROSS-REFERENCE TO RELATED APPLICATIONS

This application is a 371 national stage application of PCT Application No. PCT/US2012/023305, filed Jan. 31, 2012, which application claims the benefit of U.S. Provisional Application Ser. No. 61/437,927 filed on Jan. 31, 2011, entitled "ACOUSTIC METAMATERIALS" the entire contents of which are incorporated herein by reference.

BACKGROUND OF THE INVENTION

The present invention relates to metamaterials, and more specifically to acoustic metamaterials.

Most current damping materials consist of foams and adhesives with certain damping characteristics. Newer damping materials include acoustic metamaterials, which are man-made materials that can have superior vibro-acoustic characteristics. One example of an existing acoustic metamaterial is a one-dimensional ultrasonic metamaterial which acts as an array of Helmholtz resonators, and has a band gap near its resonance.

However, existing acoustic metamaterials are unable to handle a wide range of vibro-acoustic loads. Accordingly, it is desirable to provide improved acoustic metamaterials that handle a wider range of vibro-acoustic loads and that can be used in a wider variety of applications.

BRIEF SUMMARY OF THE INVENTION

The present invention generally provides metamaterial members including inner masses which are disposed within an outer mass. The embodiments disclosed herein provide superior vibro-acoustic damping properties across a wide range of frequencies, are easy to construct, can easily be configured into a modular system, and are amenable to easier experimental measurement of their properties thus facilitating optimization of their vibro-acoustic properties.

In some embodiments, the present disclosure provides a metamaterial member for absorbing sound or pressure. The metamaterial member includes an outer mass having a cavity formed therein. The outer mass has at least one inner edge defining the boundary of the cavity. The metamaterial member further includes at least one stem that is disposed within the cavity and extends from the inner edge. The metamaterial member further includes at least one inner mass that is disposed within the cavity. The inner mass is coupled with the stem and is configured to undergo dynamic motion upon application of sound or pressure to the outer mass.

In some embodiments, the present disclosure provides a system of pulse-absorbing building materials. The system includes a plurality of identical outer masses. Each outer mass having a cavity formed therein and has a plurality of stems disposed within the cavity. Each of the plurality of stems is attached to an inner edge of the outer mass. Each outer mass has a plurality of inner masses disposed within the cavity. Each inner mass of the plurality inner masses is attached to a stem of the plurality of stems and is configured to undergo dynamic motion upon application of sound or pressure to the outer mass.

In some embodiments, the present disclosure provides a metamaterial member for absorbing sound or pressure. The metamaterial member includes a solid outer mass that is substantially flat or two-dimensional. The metamaterial member further includes at least one inner mass that is substantially flat or two-dimensional. The at least one inner mass is embedded in the solid outer mass. The at least one inner mass includes an outer shell that is formed of a first material. The at least one inner mass further includes an inner core that is formed of a second material and is configured to undergo dynamic motion upon application of sound or pressure to the outer mass.

In some embodiments, the present disclosure provides a metamaterial member for absorbing sound or pressure. The metamaterial member includes a solid block mass. The metamaterial member further includes at least one inner mass that is embedded in the solid outer mass. The at least one inner mass includes an outer shell that is formed of a first material. The at least one inner mass further includes an inner core that is formed of a second material and is configured to undergo dynamic motion upon application of sound or pressure to the outer mass. Either (1) at least one of the outer shell or the inner core has a non-spherical shape, or (2) the at least one inner mass includes at least two inner masses that are not identical.

Further objects, features, and advantages of the present invention will become apparent from consideration of the following description and the appended claims when taken in connection with the accompanying drawings.

DETAILED DESCRIPTION OF THE INVENTION

The present invention generally provides acoustic metamaterials that handle a wide range of vibro-acoustic loads that cannot be handled by current conventional materials. For example, the acoustic metamaterials provided herein combine the effects of negative elastic modulus and/or negative effective mass density to act as local resonators that can damp out vibration and sound over multiple frequencies.

The terms "substantially" or "generally" used herein with reference to a quantity, shape, or physical parameter includes variations in the recited quantity, shape, or physical parameter that are insubstantially different from or equivalent to the recited quantity, shape, or physical parameter for an intended purpose or function. The term "pulse" as used herein includes sound waves and pressure waves, for example. The term "metamaterial member" as used herein is meant to encompass a wide variety of metamaterials. For example, phononic crystals can be included in the definition of metamaterial members without falling outside the scope of the present disclosure.

Figure 1A:
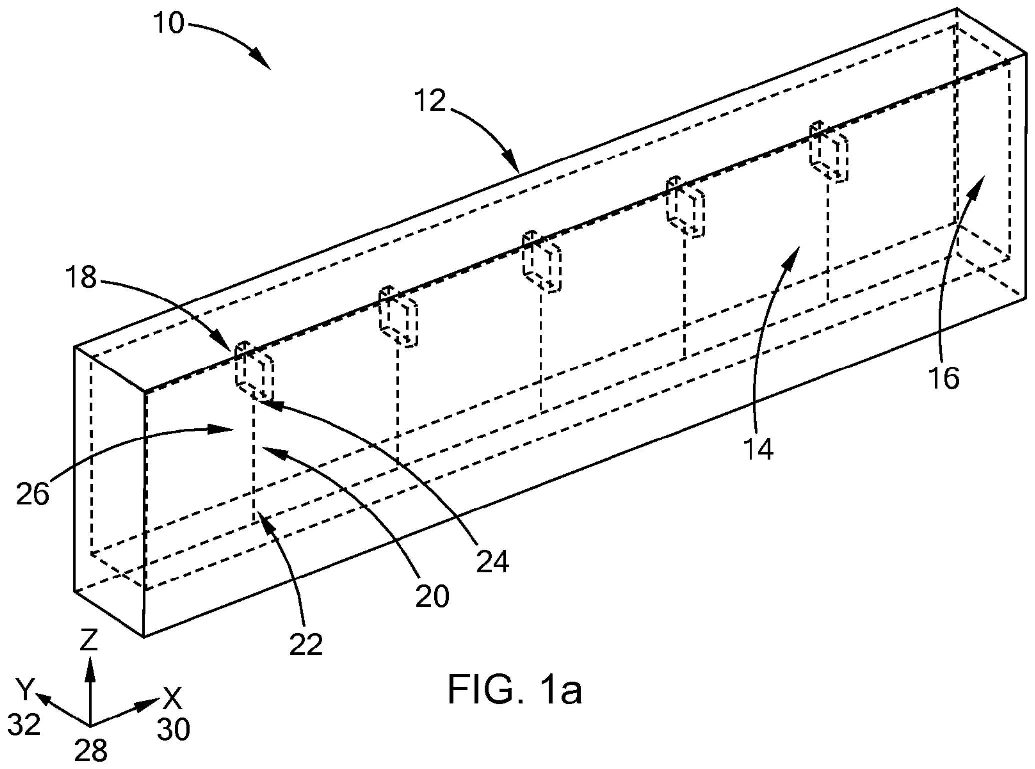
FIG. 1*a* is a perspective view of a metamaterial member in accordance with some embodiments of the present disclosure.

FIG. 1*a* illustrates a metamaterial member 10 for absorbing sound or pressure in accordance with some embodiments of the present disclosure. The inventive metamaterial member includes a block mass 12 (i.e. an outer mass) that is hollow. More particularly, the block mass 12 has a cavity 14 formed therein with one or more inner edges 16 defining the boundary of the inner cavity 14. For example, the block mass 12 be of a rectangular box shape (right cuboid) and have a rectangular box-shaped cavity formed within it, with six inner edges 16 defining the boundaries of the rectangular cavity 14, which is a void within the block mass. The inner edges 16 thus also define corresponding edges of the cavity 14. The cavity 14 may be filled with air or another gas.

An array of inner masses 18, each having its own stem 20, is disposed within the cavity 14. Each stem 20 has a first end 22 and a second end 24. The first end 22 may be coupled with, attached to, glued to, soldered to, adhesively bonded to, thermally bonded to, welded to, unitarily formed with, or of a one-piece construction with an inner edge 16 of the block mass 12. The attachment of the first end 22 to the inner edge 16 could also be accomplished with mechanical fasteners or servos. In some embodiments, the second end 24 terminates at the surface of the inner mass 18. In other embodiments, the second end 24 may pass through part, half, or all of the inner mass 18. Whether it terminates at the surface of the inner mass 18 or passes through the inner mass 18, the second end 24 may be coupled with, attached to, glued to, soldered to, adhesively bonded to, thermally bonded to, welded to, unitarily formed with, or of a one-piece construction with the inner mass 18, such that each stem 20 and inner mass 18 pair forms a stem-mass member 26. The attachment of the stem 20 to the inner mass 18 could also be accomplished with mechanical fasteners or servos. Each inner mass 18 may be free from contact with the other inner masses 18 and with edges of the cavity 14. In other words, in some embodiments, each inner mass 18 contacts only its own stem 20. Each of the stems 20 generally extends in a z-direction 28.

In some embodiments, the metamaterial member 10 may have the following dimensions. The outer mass 12 has a length along the x-direction 30 of about 6.125 inches, a length along the y-direction 32 of about 0.625 inches, and a length along the z-direction 28 of about 1.25 inches. The cavity 14 has a length along the x-direction 30 of about 6 inches (with solid portions of the outer mass 12 on either side having lengths of about 0.0625 inches), a length along the y-direction 32 of about 0.5 inches (with solid portions of the outer mass 12 on either side having lengths of about 0.0625 inches), and a length along the z-direction 28 of about 1.5 inches (with a solid portion of the outer mass 12 on the side attached to the stem-mass member 26 having a length of about 0.25 inches, and a solid portion of the outer mass 12 on the opposing side having a length of about 0.0625 inches). The stem 20 has a length of about 0.8125 inches. The inner mass 18 is an about 0.25 inch×about 0.25 inch square with a thickness of about 0.0625 inches.

FIGS. 1*b*-1*f* respectively illustrate metamaterial members 34, 36, 38, 40, 42 for absorbing sound or pressure in accordance with some embodiments of the present disclosure. Each of the metamaterial members 34, 36, 38, 40, 42 may be similar to the metamaterial member 10 of FIG. 1*a*, except for the differences described in more detail below. In some embodiments, individual features from FIGS. 1*a*-1*d* may be combined with each other.

Figure 1B:
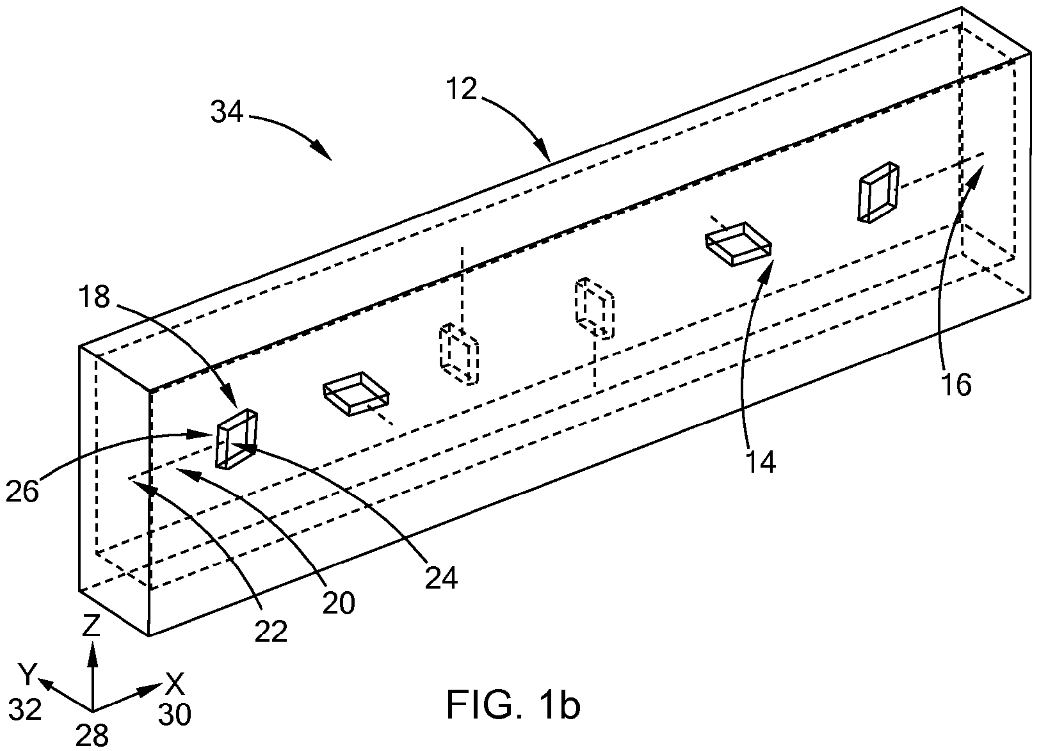
FIG. 1*b* is a perspective view of another metamaterial member in accordance with some embodiments of the present disclosure.

FIG. 1*b* illustrates a metamaterial member 34 having stem-mass members 26 extending from each of the inner edges 16, rather than from only one of the inner edges 16. Although FIG. 1*b* shows one stem-mass member 26 extending from each inner edge 16, in some embodiments (not shown), two, three, four, five, or more stem-mass members 26 may extend from each of the inner edges 16. Some of the stems generally extend in the x-direction 30, others in the z-direction 32, and others in the z-direction 28.

Figure 1C:
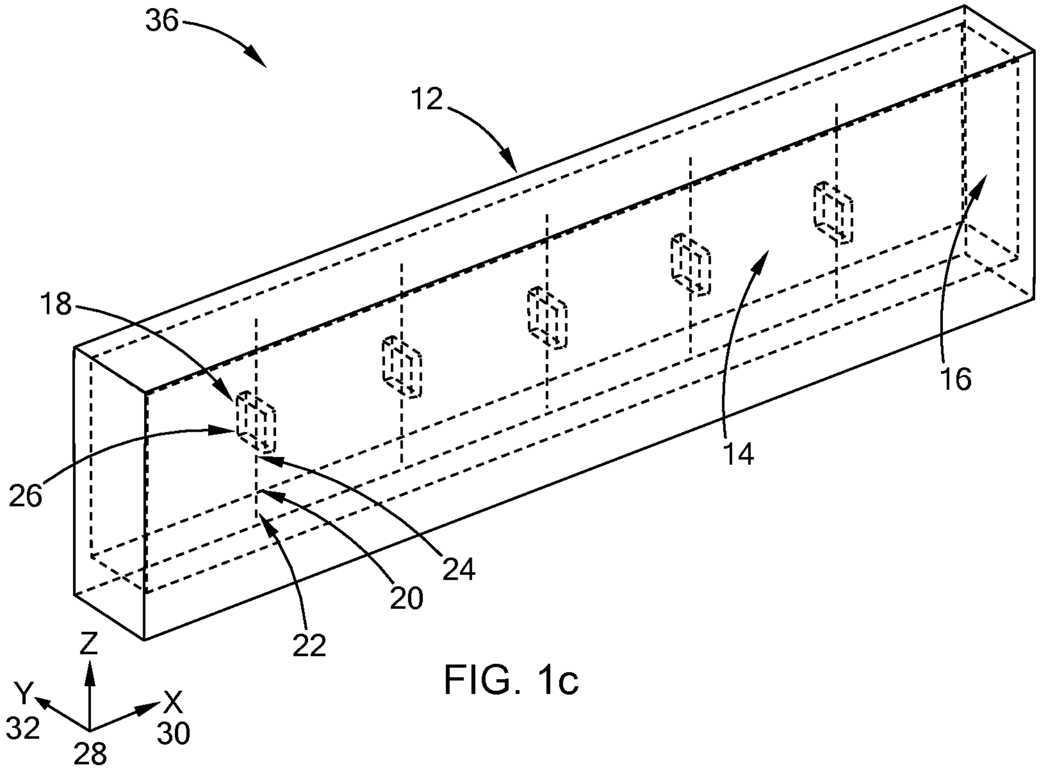
FIG. 1*c* is a perspective view of another metamaterial member in accordance with some embodiments of the present disclosure.

FIG. 1*c* illustrates a metamaterial member 36 having stems 20 that are attached the two opposing inner edges 16, rather than only one inner edge 16. An inner mass 18 is attached at about the center of each stem 20. For example, the inner mass 18 may have a bore through which the stem 20 is disposed, and the surface defined by the bore in the inner mass 18 may be attached to, coupled with, glued to, soldered to, adhesively bonded to, thermally bonded to, or welded to the stem 20. The attachment of the stem 20 to the inner mass 18 could also be accomplished with mechanical fasteners or servos. Passing the stem 20 through the inner mass 18 may advantageously provide for ease of manufacturing. In other embodiments, the inner mass 18 may be unitarily formed with or of a one-piece construction with the stem 20. Each of the stems 20 generally extends in a z-direction 28.

Figure 1D:
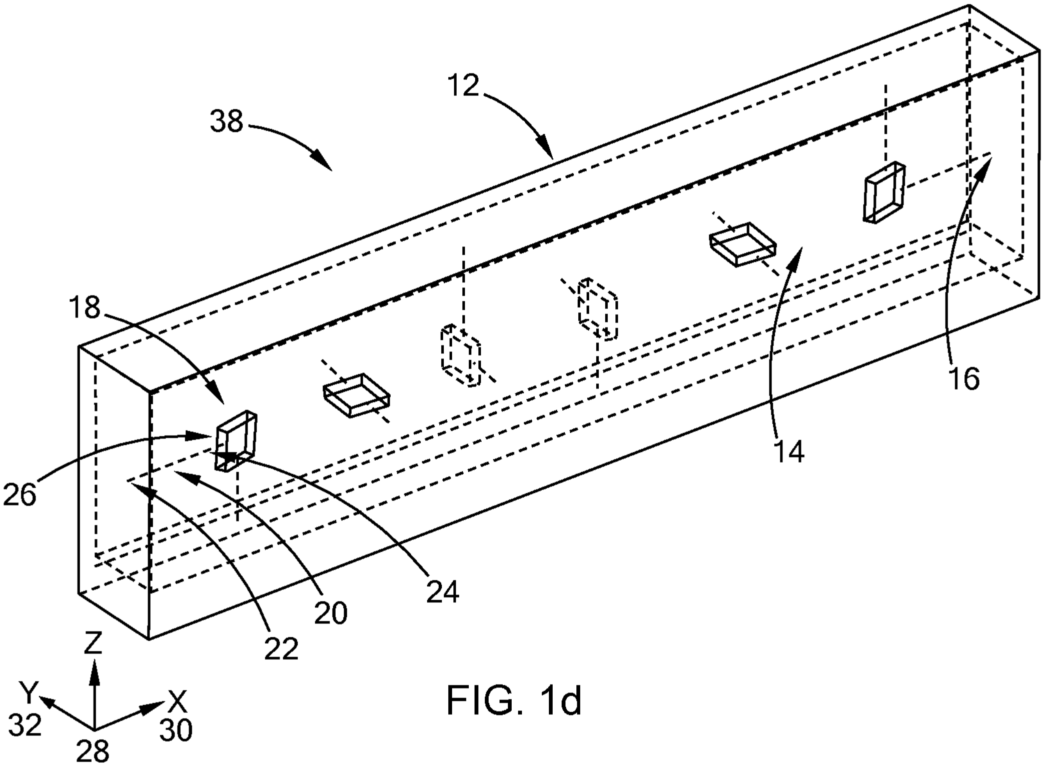
FIG. 1*d* is a perspective view of another metamaterial member in accordance with some embodiments of the present disclosure.

FIG. 1*d* illustrates a metamaterial member 38 having inner masses 18 that are each attached to two stems 20. As shown, some of the inner masses 18 have two stems 20 that extend from opposing sides of the inner mass 18, are attached to opposing inner edges 16 of the block mass 12, and are thus about or substantially parallel to each other. Other inner masses 18 have two stems 20 that extend from adjacent sides of the inner mass 18, are attached to adjacent inner edges 16 of the block mass 12, and are thus about or substantially perpendicular to each other. In other embodiments (not shown), each of the inner masses 18 may have three, four, five, or six stems 20 attached to three, four, five, or six different sides and three, four, five, or six different inner edges 16. Some of the stems generally extend in the x-direction 30, others in the z-direction 32, and others in the z-direction 28. In some embodiments (not shown), some inner masses 20 have two or more stems 18 that extend at acute or obtuse angles relative to each other. The angles could be about 45 degrees, about 135 degrees, or between about 10 to about 35 degrees, or between about 35 to about 55 degrees, or between about 55 to about 80 degrees, or between about 100 to about 125 degrees, or between about 125 to about 145 degrees, or between about 145 to about 170 degrees, for example.

Figure 1E:
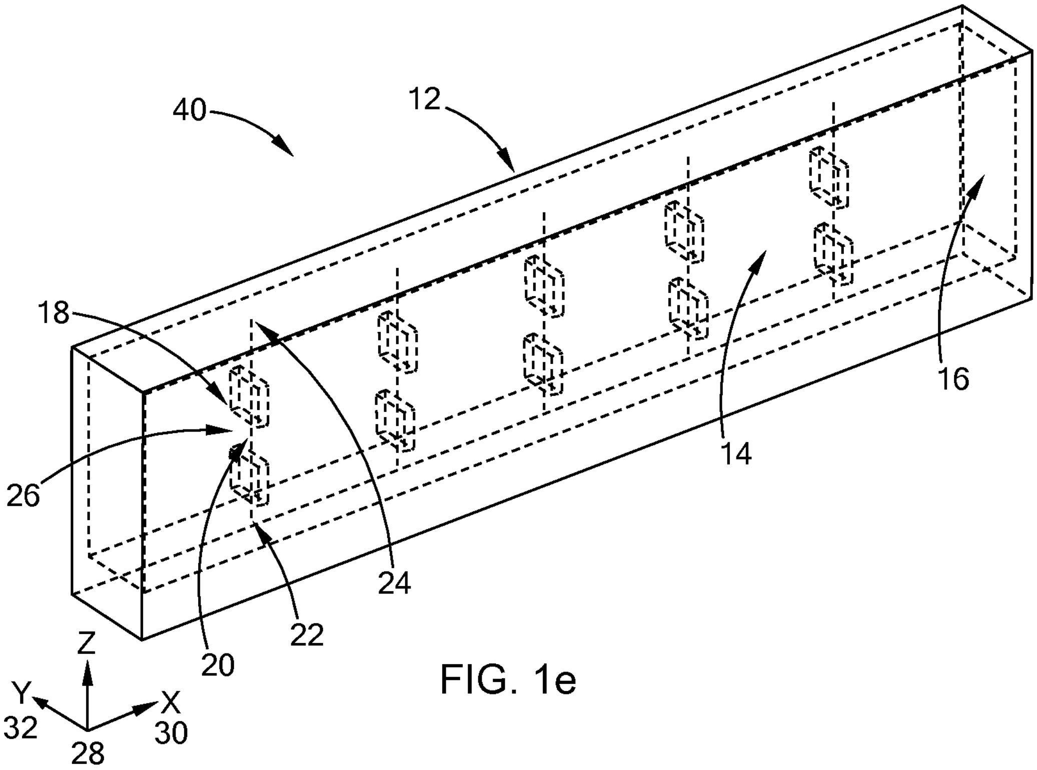
FIG. 1*e* is a perspective view of another metamaterial member in accordance with some embodiments of the present disclosure.

FIG. 1*e* illustrates a metamaterial member 40 that is similar to the metamaterial member 36 of FIG. 1*c*, except that each stem 20 passes through and is attached to two inner masses 18 rather than one inner mass 18. In other embodiments (not shown), a single stem 20 could pass through three, four, five, six, or any number of inner masses 18. In other embodiments (not shown), a single stem 20 could extend from an inner edge 16, pass through a one, two, three, four, or more inner masses 18, and terminate at an attachment to a surface of another inner mass 18. In some embodiments (not shown), rather than a single stem 18 which passes through two inner masses 18, multiple stems 18 could be used. For example, a first stem 20 could attach a first inner edge 14 to a first inner mass 18, a second stem 20 could attach the first inner mass 18 to a second inner mass 18, and a third stem 20 could be attach the second inner mass 18 to a second inner edge 14 that is opposite to the first inner edge 14, or in other embodiments, adjacent to the first inner edge 14.

Figure 1F:
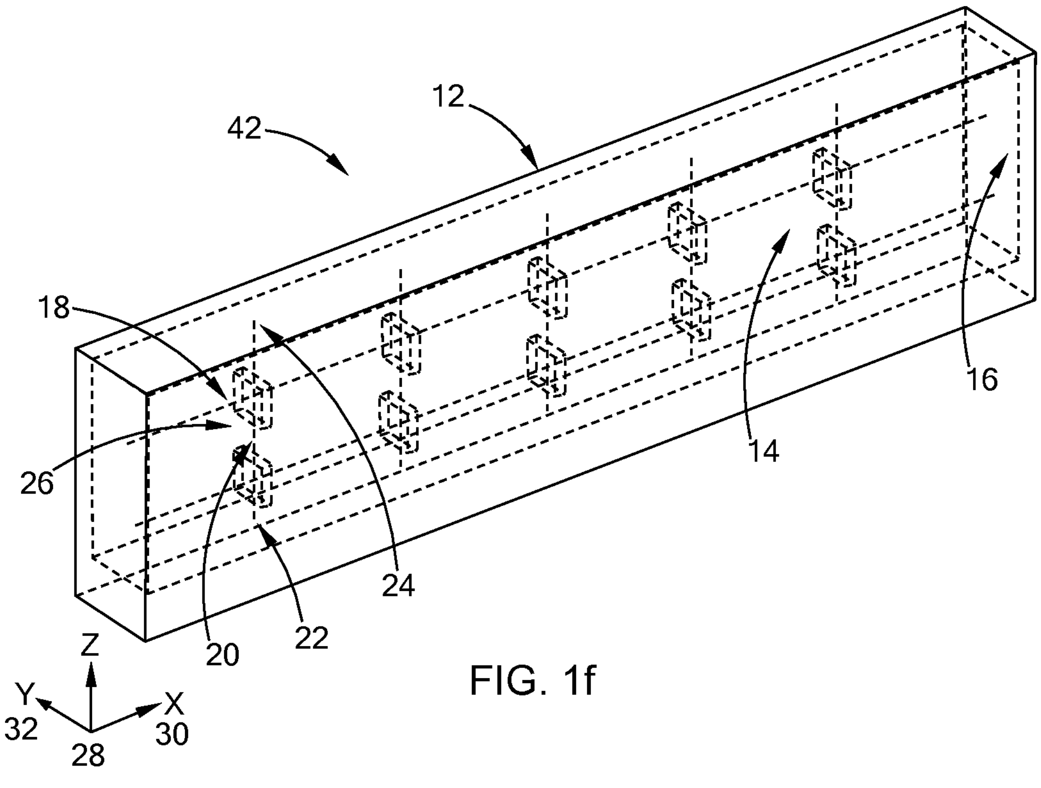
FIG. 1*f* is a perspective view of another metamaterial member in accordance with some embodiments of the present disclosure.

FIG. 1*f* illustrates a metamaterial member 42 that is similar to the metamaterial member 40 of FIG. 1*e*, except that, in addition to the stems extending along the z-direction 28, additional stems 20 are included which pass through the inner masses 18 and which extend along the x-direction 30. Thus, the inner masses 18 lie on a grid at points of intersection of stems 20. In this embodiment, all the inner masses 18 and stems 20 together constitute a single stem-mass member 26. In some embodiments (not shown), rather than a single stem 18 which passes through multiple inner masses 18 and is attached at either end to opposing inner edges 16, multiple stems 18, which do not pass through the inner masses 18, could be used, as discussed above with respect to FIG. 1*e*.

Although the embodiments of FIGS. 1*a*, 1*c*, 1*e*, and 1*f* each show five stem-mass members 26 arranged in a single ordered (periodic) row with equal spaces between each stem-mass member 26, in other embodiments (not shown), the row could instead include one, two, three, four, six, seven, eight, nine, ten, or any number of stem-mass members 26. Moreover, some embodiments (not shown) may include two, three, four, five, six, seven, eight, nine, ten, or more rows of stem-mass members 26. In these embodiments, the stem-mass members 26 may form an ordered (periodic) grid of stem-mass members 26, wherein columns and rows are spaced equally apart. In some embodiments (not shown), the spacings between each the rows or columns of stem-mass members 26 could be variable rather than ordered. In other embodiments (not shown), the stem-mass members 26 could be disposed in various other patterns, such as in a circle or square, or may be disposed in an irregular fashion.

Turning more specifically to FIGS. 1*e* and 1*f*, the metamaterial members 40, 42 show a two-dimensional grid of inner masses 18, these metamaterial members 40, 42 may include a third dimension of inner masses 18. Thus the metamaterial members 40, 42 may have a three-dimensional grid of inner masses, which two, three, four, five, six, seven, eight, nine, ten, or more of inner masses 18 extending along each of the x-, y-, and z-directions 30, 32, 28. Moreover, these embodiments may include, in addition to the stems extending along the x-direction 30 and z-direction 28, additional stems 20 attached to the inner masses 18 and which extend along the y-direction 32.

As shown in FIGS. 1*a*, 1*c*, 1*e*, and 1*f*, the inner masses 18 are each about or substantially flat (two-dimensional), have a square shape, and have two opposed faces. The opposed faces are oriented about or substantially parallel to each other. Additionally, the opposed faces of separate inner masses 18 are shown oriented about or substantially parallel to each other along the y-direction 28. In other embodiments, as shown in FIGS. 1*b* and 1*d*, some inner masses 18 that are oriented along the y-direction 32 could be about or substantially perpendicular to other inner masses 18 that oriented along the x-direction 30. In some embodiments (not shown), some inner masses 18 could be oriented at acute or obtuse angles relative to other inner masses 18. The angles could be about 45 degrees, about 135 degrees, or between about 10 to about 35 degrees, or between about 35 to about 55 degrees, or between about 55 to about 80 degrees, or between about 100 to about 125 degrees, or between about 125 to about 145 degrees, or between about 145 to about 170 degrees, for example. Some of the inner masses 18 of FIGS. 1*a*, 1*c*, 1*e*, and if could be reoriented such that the opposed faces of some inner masses 18 are about or substantially perpendicular to or at an angle to other inner passes 18, for example in alternating patterns.

Figure 2A:
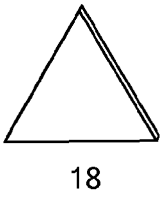
FIG. 2*a* is a side view of an inner mass in accordance with some embodiments of the present disclosure.
Figure 2B:
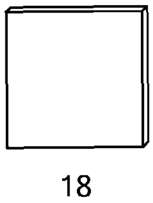
FIG. 2*b* is a side view of another inner mass in accordance with some embodiments of the present disclosure.
Figure 2C:
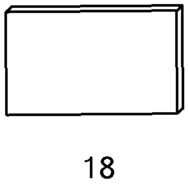
FIG. 2*c* is a side view of another inner mass in accordance with some embodiments of the present disclosure.
Figure 2D:
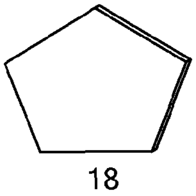
FIG. 2*d* is a side view of another inner mass in accordance with some embodiments of the present disclosure.
Figure 2E:
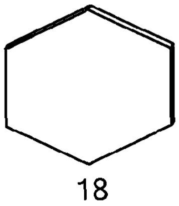
FIG. 2*e* is a side view of another inner mass in accordance with some embodiments of the present disclosure.
Figure 2F:
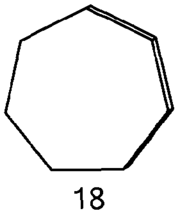
FIG. 2*f* is a side view of another inner mass in accordance with some embodiments of the present disclosure.
Figure 2G:
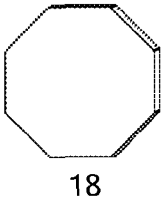
FIG. 2*g* is a side view of another inner mass in accordance with some embodiments of the present disclosure.
Figure 2H:
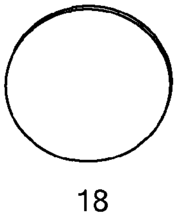
FIG. 2*h* is a side view of another inner mass in accordance with some embodiments of the present disclosure.
Figure 2I:
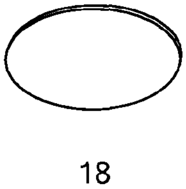
FIG. 2*i* is a side view of another inner mass in accordance with some embodiments of the present disclosure.
Figure 2J:
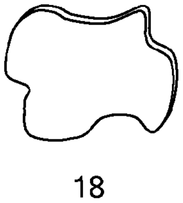
FIG. 2*j* is a side view of another inner mass in accordance with some embodiments of the present disclosure.

Although FIGS. 1*a*-1*f* show inner masses 18 that are about or substantially flat or two-dimensional, with two opposed faces, and have square shapes, other shapes can be used in any of these embodiments disclosed herein. For example, FIGS. 2*a*-2*j* respectively illustrate inner masses 18 in accordance with some embodiments of the present disclosure. In some embodiments, the inner mass 18 may be about or substantially flat or two-dimensional, with opposing faces. Additionally, the inner mass 18 can be shaped as a polygon such as a triangle (FIG. 2*a*), square (FIGS. 1*a*-1*f* and 2*b*) rectangle (FIG. 2*c*), pentagon (FIG. 2*d*), hexagon (FIG. 2*e*), heptagon (FIG. 2*f*), or octagon (FIG. 2*g*), for example. In other embodiments, the inner mass 18 can be shaped as a circle (FIG. 2*h*) or oval (FIG. 2*i*), or as an irregular shape (FIG. 2*j*).

Figure 3A:
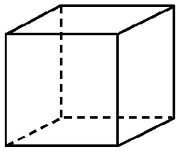
FIG. 3*a* is a perspective view of an inner mass in accordance with some embodiments of the present disclosure.
Figure 3B:
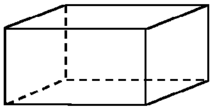
FIG. 3*b* is a perspective view of another inner mass in accordance with some embodiments of the present disclosure.
Figure 3C:
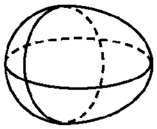
FIG. 3*c* is a perspective view of another inner mass in accordance with some embodiments of the present disclosure.
Figure 3D:
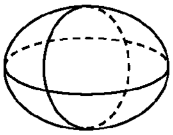
FIG. 3*d* is a perspective view of another inner mass in accordance with some embodiments of the present disclosure.
Figure 3E:
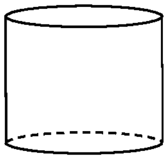
FIG. 3*e* is a perspective view of another inner mass in accordance with some embodiments of the present disclosure.
Figure 3F:
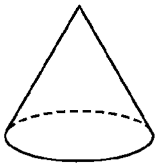
FIG. 3*f* is a perspective view of another inner mass in accordance with some embodiments of the present disclosure.
Figure 3G:
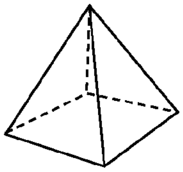
FIG. 3*g* is a perspective view of another inner mass in accordance with some embodiments of the present disclosure.
Figure 3H:
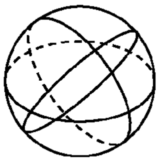
FIG. 3*h* is a perspective view of another inner mass in accordance with some embodiments of the present disclosure.
Figure 3I:
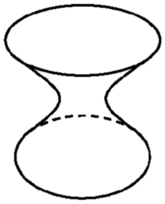
FIG. 3*i* is a perspective view of another inner mass in accordance with some embodiments of the present disclosure.
Figure 3J:
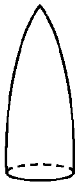
FIG. 3*j* is a perspective view of another inner mass in accordance with some embodiments of the present disclosure.
Figure 3K:
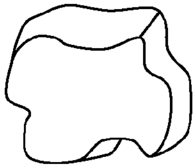
FIG. 3*k* is a perspective view of another inner mass in accordance with some embodiments of the present disclosure.

In other examples, FIGS. 3*a*-3*k* respectively illustrate inner masses 18 in accordance with some embodiments of the present disclosure. In these embodiments, the inner mass 18 has a three-dimensional form (greater thickness than about or substantially flat or two-dimensional), and is shaped as a polyhedron such as a cube (FIG. 3*a*), cuboid (for example, a right cuboid i.e. rectangular box) (FIG. 3*b*), ovoid (FIG. 3*c*), ellipsoid (FIG. 3*d*), cylinder (FIG. 3*e*), cone (FIG. 3*f*), or pyramid (FIG. 3*g*), for example. Additionally, the inner mass 18 can be shaped as a sphere (FIG. 3*h*), hyperboloid (FIG. 3*i*), paraboloid (FIG. 3*j*), or as an irregular shape (FIG. 3*k*). The inner masses 18 may have any other shape desired for an application, or may about or substantially have any of the shapes listed above (e.g. about or substantially circular).

In the embodiments of FIGS. 2*a*-3*k*, the inner masses 18 could be formed of any suitable material. For example, the inner masses 18 could be copper. Copper may have a Young's Modulus of about $110\times10^{9}$ GPa, a Poisson ratio of about 0.35, and a density of about 8700 kg/m$^3$. The copper inner mass 18 could have epoxy resin disposed on its surfaces, which could assist with fixing the stem to the inner mass 18. The epoxy resin coating could be about 0.1 mm thick. The epoxy resin may have a Young's Modulus of about $110\times10^{9}$ GPa, a Poisson ratio of about 0.343, and a density of about 2600 kg/m$^3$. The copper inner mass 18 could also be coated with an aliphatic polyamine hardener to ensure that the inner mass 18 is properly mounted on the stem 20. In other embodiments, the inner masses 18 could be formed of sheets of hard paper, plastic, or other metals, by way of example. Any monolithic or composite material could be used.

FIGS. 4*a*-4*d* respectively illustrate respectively illustrate inner masses 18 in accordance with some embodiments of the present disclosure. In these embodiments, each of the inner masses 18 includes or consists of an inner core 44 inside, disposed within, or embedded in an outer shell 46. The inner core 44 may be rigidly or movably attached to the outer shell 46, for example. In some embodiments, the inner core 44 may be disposed entirely inside the outer shell 46, and in other embodiments part of the inner core 44 may be exposed on a face or outer surface of the inner mass 18, or may protrude from the outer shell 46.

Figure 4A:
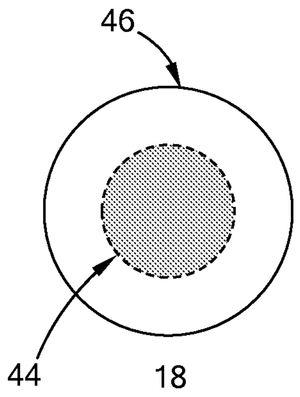
FIG. 4*a* is a perspective view of an inner mass in accordance with some embodiments of the present disclosure.
Figure 4B:
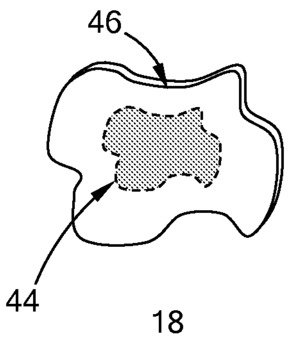
FIG. 4*b* is a side view of another inner mass in accordance with some embodiments of the present disclosure.
Figure 4C:
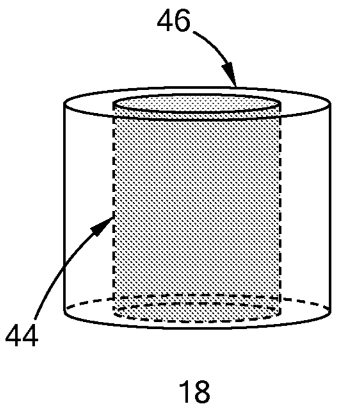
FIG. 4*c* is a perspective view of another inner mass in accordance with some embodiments of the present disclosure.
Figure 4D:
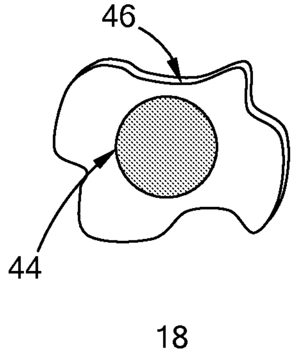
FIG. 4*d* is a side view of another inner mass in accordance with some embodiments of the present disclosure.

The shapes of each of the inner core 44 and the outer shell 46 can be selected from the shapes in FIGS. 2*a*-3*k*. For example, FIG. 4*a* shows a spherical inner core 44 that is disposed entirely inside a spherical outer shell 46. FIG. 4*b* shows about or an about or substantially flat or two-dimensional irregular inner core 44 inside an about or substantially flat or two-dimensional irregular outer shell 46, wherein the inner core 44 is embedded entirely inside the opposing faces of the inner mass 18. FIG. 4*c* shows a cylindrical inner core 44 inside a cylindrical outer shell 46, wherein the inner core 44 is exposed on an outer surface of the inner mass 18. FIG. 4*d* shows an about or substantially flat or two-dimensional circular inner core 44 inside an about or substantially flat or two-dimensional irregular outer shell 46, wherein the inner core 44 is exposed on the opposing faces of the inner mass. However, other combinations of the foregoing features may be implemented without falling outside the scope of the present disclosure.

In these embodiments, each of the inner core 44 and the outer shell 46 can be made of any monolithic or composite material. Either of the monolithic material or the composite material could be a solid, rigid, flexible, or elastomeric material. Preferably, the inner core 44 is a solid, rigid material, and the outer shell 46 is a flexible, elastomeric material. Also preferably, the inner core 44 has a greater stiffness, greater elastic modulus, or greater stiffness and greater elastic modulus, relative to the outer shell 46. An example of the solid, rigid material is copper, as discussed above. Examples of elastomeric materials include rubber, silicone, latex, or a polyurethane alloy. In some embodiments, the epoxy resin and aliphatic polyamine hardener discussed earlier can also be coated on the outer shell 46.

Moreover, in these embodiments, the stem 20 can be attached, according to any of the methods described earlier, at the outer surface of outer shell 46. Alternatively, the stem 20 may extend partially through the outer shell 46 and/or the inner mass 44. For example, the stem 20 may extend through the outer shell 46 until it reaches the outer surface of the inner mass 44, at which point it attaches, according to any of the methods described earlier, to the outer surface of the inner mass 44. In embodiments where the stem 20 passes entirely through the inner mass 18, the stem 20 may pass through only the outer shell 46 or it may pass through both the inner core 44 and the outer shell 46.

In some embodiments, in a single outer mass 12, the inner masses 18 could each have a different shape that is selected from the above shapes as described in reference to FIGS. 2*a*-4*d*. For example, one, two, or more inner masses 18 could have about or substantially flat or two-dimensional rectangular shapes, another one, two, or more inner masses 18 could have about or substantially flat or two-dimensional circular shapes, and another one, two, or more inner masses 18 could have about or substantially flat or two-dimensional ovular shapes. Additionally, in a single outer mass 12, some of the inner masses 18 could have different sizes. For example, in a single outer mass 12, some inner masses 18 could be larger than others. In various embodiments, there may be two, three, four, five, or more tiers of sizes, for example. In some embodiments, in a single outer mass 12, some inner mass 18 could me made of a different of different materials than other inner masses. In various embodiments, there could be two, three, four, five, or more different types combinations of materials used for the inner masses 18 in a particular outer mass 12. For example, for embodiments of inner masses 18 having an inner core 44 and an outer shell 46, some inner cores 44 could be made of different material than other inner cores 46. Alternatively or additionally, some outer shells 46 could be made of different materials than other outer shells 46.

In all of the embodiments described herein, the stems 20 could be flexible or extremely flexible, both for ease of manufacturing and for advantageous pulse absorption. The stems 20 could be wire lines or string lines. The stems 20 could be formed of a shape memory material, for example a shape memory polymer or a shape memory alloy such as Nitinol. The shape memory alloy may have a Young's Modulus of about $75\times10^9$ GPa, a Poisson ratio of about 0.3, and a density of about 6450 kg/$m^3$. However, other metals or plastics could be used, or any other suitable material, such as a rubber or rubber with a thin metal fiber disposed within it. The thin metal fiber could be tin or copper, by way of example. In some embodiments, steel or platinum could be used. In some embodiments, the stems 20 could be springs or coils.

The inner masses 18 and stems 20 could be designed to absorb a desirable amount of sound or pressure. The stem-mass members 26 may be configured to undergo dynamic motion relative to the outer mass 12. Upon application of force to the outer mass 12, the stem-mass members 26 may undergo dynamic cantilever action, and form an array of localized resonators. Due to the flexibility of the stem 20, when an inner mass 18 is connected to a stem 20 that generally extends, for example, along the z-direction 28, the inner mass 18 may generally move only in an x-direction 30 and/or y-direction 32 due to flexibility of the stem 20. Additionally, in some embodiments, particularly those in which the stems 20 are configured as springs or coils, the inner 18 may also move in the z-direction 28. In some embodiments, the stems 20 could be configured to move only in one of the x-, y-, and z-directions 30, 32, 28, and in other embodiments may be configured to move in only the y- and z-directions 32, 28, or in only the x- and z-directions 30, 28. In any given metamaterial member of FIGS. 1*a*-1*f*, some of the stems 20 may be configured as a first set of materials and configurations described herein (for example, a wire that moves only in the x- and y-directions 30, 32), and other stems 20 may be configured as a second set of materials and configurations described herein (for example, a spring that moves in all three directions 30, 32, 28). In certain embodiments, it is preferred that the inner masses 18 move upon encountering sound or pressure without contacting the edges of the cavity 14 or each other; however, this is not required.

The outer mass 12 that surrounds the inner masses 18 and stems 20 could also be formed of any suitable material, including any monolithic or composite material. For example, the outer mass 12 could be constructed of a plastic or a metal, such as PMMA (poly(methyl methacrylate)) or aluminum. PMMA may have a Young's Modulus of about $3\times10^9$ GPa, a Poisson ratio of about 0.4, and a density of about 1190 kg/$m^3$. In other examples, the outer mass 12 could be constructed of carbon fibers in an epoxy matrix. In embodiments where the outer mass 12 has a cavity 14, air in the cavity may, when at about 20 degrees Celsius, have a density of about 1.25 kg/$m^3$ and allow sound waves to pass through at a speed of about 343 m/s. The cavity 14 could contain incompressible, inviscid fluid.

FIGS. 5*a*, 5*b*, 6*a*, and 6*b* respectively illustrate metamaterial members 48, 50, 52, 54 for absorbing sound or pressure in accordance with some embodiments of the present disclosure. These embodiments are similar to the embodiments disclosed in FIGS. 1*a*-1*f*, except that the outer mass 12 is solid (i.e. does not have a cavity), and the metamaterial members 48, 50 have no stems 20. In these embodiments, the inner masses 18, which can be any of the inner masses 18 described herein with respect to FIGS. 2*a*-4*c*, is inside, disposed within, or embedded in the outer mass 12. In some embodiments, the inner masses 18 may be disposed entirely inside the outer mass 12, and in other embodiments part of some or all of the inner masses 18 may be exposed on an outer surface of the outer mass 12, or may protrude from the outer mass 12.

Figure 5A:
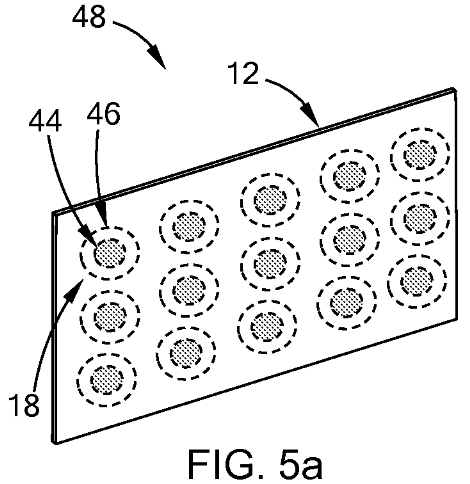
FIG. 5*a* is a perspective view of another metamaterial member in accordance with some embodiments of the present disclosure.
Figure 5B:
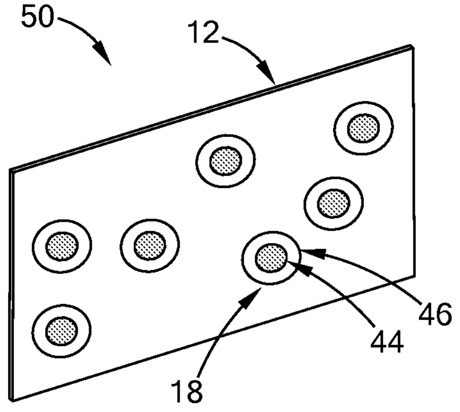
FIG. 5*b* is a perspective view of another metamaterial member in accordance with some embodiments of the present disclosure.

FIGS. 5*a* and 5*b* show metamaterial members 48, 50 including an outer mass 12 and inner masses 18. In these embodiments, the outer mass 12 and inner masses 18 of the metamaterial members 48, 50 may each be about or substantially flat or two-dimensional. For example, the metamaterial members 48, 50 can be thin films. The thickness of the metamaterial members 48, 50 can, for example, be no more than about 50 micrometers, about 250 micrometers, 500 micrometers, about 1 millimeter, about 5 millimeters, about 1 centimeter, or about 2 centimeters, for example. Although the outer mass 12 is shown having a rectangular shape, and the inner masses 18 are shown having circular inner cores 44 and circular outer shells 46, the outer mass 12, inner cores 44, and outer shells 46 may each have any of the shapes described herein with respect to FIGS. 2*a*-4*d*, as discussed in more detail below, and may have any of the properties described earlier.

In one example, FIG. 5*a* shows ordered (periodic) rows and columns of inner masses 18 (i.e. the inner masses 18 in each row or column are spaced equally apart) to form an ordered (periodic) two-dimensional grid. As shown, the inner masses 18 are embedded entirely inside the outer mass 12, thus the outer mass 12 can be thicker than the inner masses 18. However, in other embodiments, the outer shells 46, and optionally, the inner cores 44, may extend to and be visible on one or more of the opposing faces of the metamaterial member 48, thus the outer mass 12 and the inner masses 18 have about the same thickness.

In another example, FIG. 5*b* shows a disordered, non-periodic, irregular, random arrangement of inner masses 18. As shown, the inner masses 18 extend to and are visible on each of the opposing faces of the metamaterial member 50. However, in other embodiments, the inner masses 18 may be embedded entirely inside the outer mass 12.

Figure 6A:
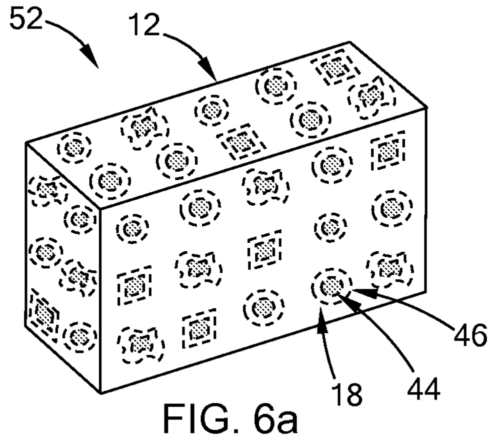
FIG. 6*a* is a perspective view of another metamaterial member in accordance with some embodiments of the present disclosure.
Figure 6B:
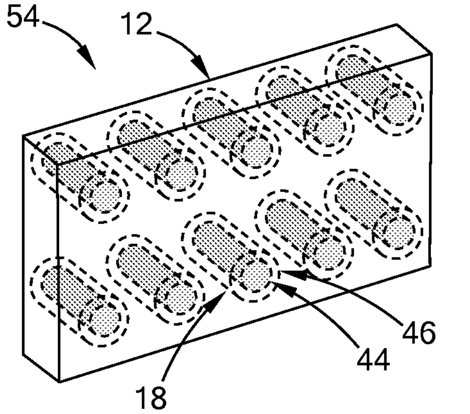
FIG. 6*b* is a perspective view of another metamaterial member in accordance with some embodiments of the present disclosure.

FIGS. 6*a* and 6*b* show metamaterial members 52, 54 including an outer mass 12 and inner masses 18. In these embodiments, the outer mass 12 is a block mass having a three-dimensional form that is thicker than about or substantially flat or two-dimensional. Although the outer mass 12 is shown having a rectangular shape, and the inner mass 18 are shown having spherical (FIG. 6*a*) or cylindrical (FIG. 6*b*) inner masses 18, the outer mass 12, inner core 44, and outer shell 46 may each have any of the shapes described herein with respect to FIGS. 2*a*-4*d*, as discussed in more detail below, and may have any of the properties described earlier.

In one example, FIG. 6*a* shows ordered (periodic) rows, columns, and a third-dimensional row of spherical inner masses 18 (i.e. the inner masses 18 in each row, column, or third-dimensional row are spaced equally apart) to form a three-dimensional ordered (periodic) grid. As shown, each of the inner masses 18 are embedded entirely within the outer mass 12, but in other embodiments some of the inner masses 18 may be exposed on the face of the metamaterial member 52. Some or all of the inner masses 18 may be non-spherical or about non-spherical. Additionally, the inner masses 18 of the metamaterial member 52 may have different shapes, sizes, as shown, and may be made of different materials. In other embodiments (not shown), all of the inner masses 18 may be identical. In some embodiments, in analogy with FIG.

5*b*, the inner masses 18 of the metamaterial member 52 could be disposed throughout the three-dimensional outer mass 12 in a disordered, non-periodic, irregular, random arrangement.

In another example, FIG. 6*b* shows ordered (periodic) rows and columns of the cylindrical inner masses 18 of FIG. 4*c*. In this embodiment, the cylindrical inner masses 18 are embedded entirely inside the outer mass 12. In other embodiments, the inner masses 18 may extend from one face to an opposing face of the outer mass 12; in these embodiments, the inner cores 44 and outer shells 46 are visible on each of the opposing faces of the metamaterial member 54. Although in FIG. 6*b*, the lengthwise extents of the cylindrical inner masses 18 are parallel to each of the four smallest faces (of six total faces) of the outer mass 12, in some embodiments, the cylindrical inner masses 18 can be oriented at a 90 degree angle relative to the angle shown in FIG. 6*b*, such that the lengthwise extents of the cylindrical inner masses 18 are (1) parallel to the large faces of the outer mass 12 to the two medium sized faces, but perpendicular to the two smallest faces, or (2) parallel to the large faces of the outer mass 12 and to the two smallest sized faces, but perpendicular to the two medium sized faces. In other embodiments, some of the cylindrical inner masses 18 can be disposed perpendicular to other cylindrical inner masses 18, by including cylindrical masses 18 having each of the above orientations.

Additionally, in the embodiments of FIGS. 6*a* and 6*b*, some of the inner masses 18 may instead be substantially flat or two-dimensional, and others may have a three-dimensional form. For example, several three-dimensional inner masses 18 (block masses) may be disposed within the outer mass 12, while several substantially flat or two-dimensional inner masses 18 may be formed on the surface of the outer mass 12 or embedded within the outer mass 12. Either of the substantially flat or two-dimensional inner masses 18 or the three-dimensional inner masses 18 may have ordered (periodic) or disordered (non-periodic) arrangements. Moreover, the embodiments of FIGS. 6*a* and 6*b* can be combined with the embodiments of FIGS. 1*a*-1*f*, such that a first portion of the outer mass 12 has a cavity 14 having stem-mass members 26, and a second portion of the outer mass 12 is solid with inner masses 18 embedded therein.

In embodiments where inner masses 18 are embedded in the outer mass 12, the inner masses 18 could be designed to absorb a desirable amount of sound or pressure. The inner masses 26 may be configured to undergo dynamic motion relative to the outer mass 12. For example, if the inner masses 18 each have an inner core 44 having a greater stiffness or elastic modulus relative to its outer shell 46, then upon application of force to the outer mass 12, the inner cores 18 may dynamically move within the outer shells 18, thus absorbing sound or pressure. Alternatively, if the inner masses 18 each have a greater stiffness or elastic modulus relative to the outer mass 12, then the entire inner masses 18, including the inner mass 44 and outer shell 46, themselves may undergo dynamic motion within the outer mass 12, thus absorbing sound or pressure. In embodiments combining these features, wherein the inner core 44 each have greater stiffness or elastic modulus relative to the outer shells 46, and the outer shells 46 have greater stiffness or elastic modulus relative to the outer mass 12, then the entire inner mass 18 can undergo dynamic motion relative to the outer mass 12, but the inner core 44 can additionally undergo dynamic motion relative to the outer shell 46.

For example, in these embodiments, the inner mass 18 could have greater stiffness or elastic modulus relative to the outer mass 12. Each of these types of motion may be configured to occur in one, two, or all three of an x-, y-, and z-direction 30, 32, 28.

In embodiments where the outer mass 12 is about or substantially flat or two-dimensional (e.g. the embodiments of FIGS. 5*a* and 5*b*), the outer mass 12 can have any of the shapes described herein with respect to FIGS. 2*a*-2*j*. Alternatively, in embodiments where the outer mass 12 has a three-dimensional form (e.g. the embodiments of FIGS. 1*a*-1*f*, 6*a*, and 6*b*), the outer mass 12 can have any of the three-dimensional shapes described herein with respect to FIGS. 3*a*-3*k*. Moreover, in any of the embodiments, the outer mass 12 can have a wavy irregular shape, or have a wavy regular periodic shape. In these embodiments, the outer surface of the outer mass 12 may be corrugated. Referring to the embodiments of FIGS. 1*a*-1*f*, the inner edges 16 can correspond to the shape of the cavities 14. For example, a spherical cavity 14 has a spherical inner edge 16, and cylindrical cavity 14 has a tubular edge 16 disposed between two flat inner edges 16. In other embodiments, the cavity 14 can have a different shape than the other mass 12. For example, the outer mass can be a rectangular box, and the cavity 14 can be spherical.

Moreover, and preferably, each outer mass 12 has a shape which can be tessellated (i.e. honeycombed) in two- or three-dimensional space. For example, in two-dimensional space, squares, rectangles, equilateral triangles, parallelograms, hexagons, can be used to tessellate. In three-dimensional space, right cuboids (i.e. rectangular box), tetrahedrons, octahedrons, hexagonal prisms, or triangular prisms can be used to tessellate. Some shapes with wavy, irregular surfaces, or wavy periodic regular surfaces, can also be tessellated in two- or three-dimensional space. However, other tessellating shapes can be used without falling outside of the scope of the present disclosure. As defined herein, "honeycomb" or "tessellate" means to space-fill and close-pack each outer mass 12 in two- or three-dimensional space. Alternatively, in some embodiments, shapes of outer masses 12 can be used that cannot be honeycombed, and that instead have gaps between them.

The metamaterial members disclosed herein may absorb sound and/or pressure loading that is transmitted through a medium such as air. As sound or pressure passes the air or other gas within the cavity, the energy from the sound or pressure is absorbed through the kinetic energy, i.e., the motion of, the inner masses. Therefore, in some embodiments, any of the metamaterial members disclosed herein can have a negative effective elastic modulus, which causes dispersion of applied vibro-acoustic loads, and a negative effective mass density, which causes attenuation of vibro-acoustic loads. In some embodiments, both the effective elastic modulus and the effective mass are negative, while in other embodiments, one of these properties is about zero or positive while the other is negative.

Figure 8A:
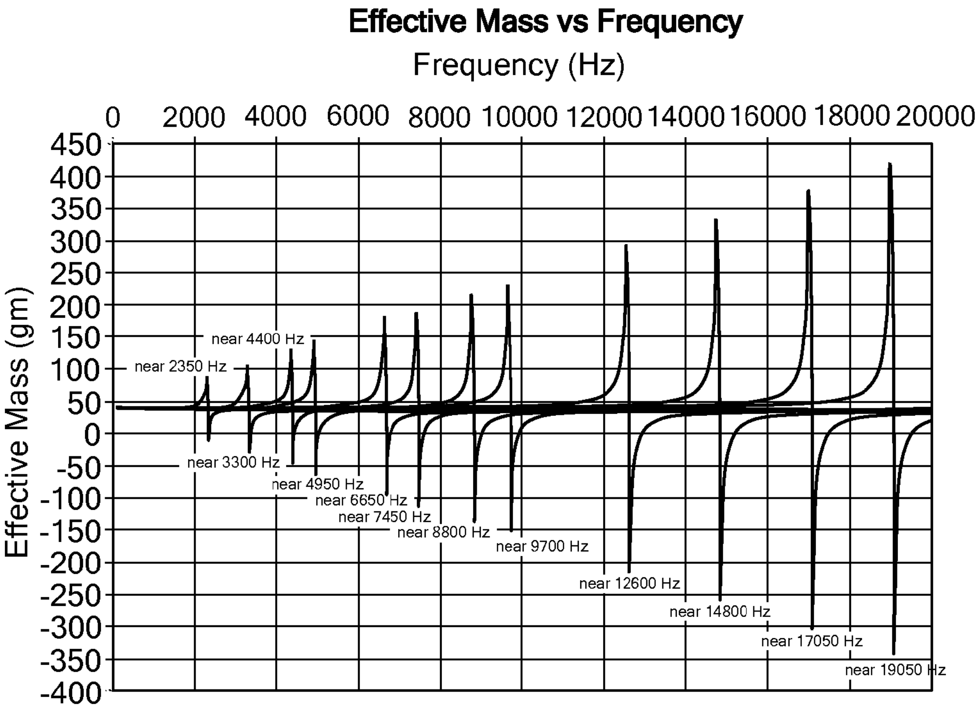
FIG. 8*a* is a chart showing the asymptotic nature of effective mass near natural resonant frequencies of the metamaterial member of FIG. 1*a*, in accordance with some embodiments of the present disclosure.
Figure 8B:
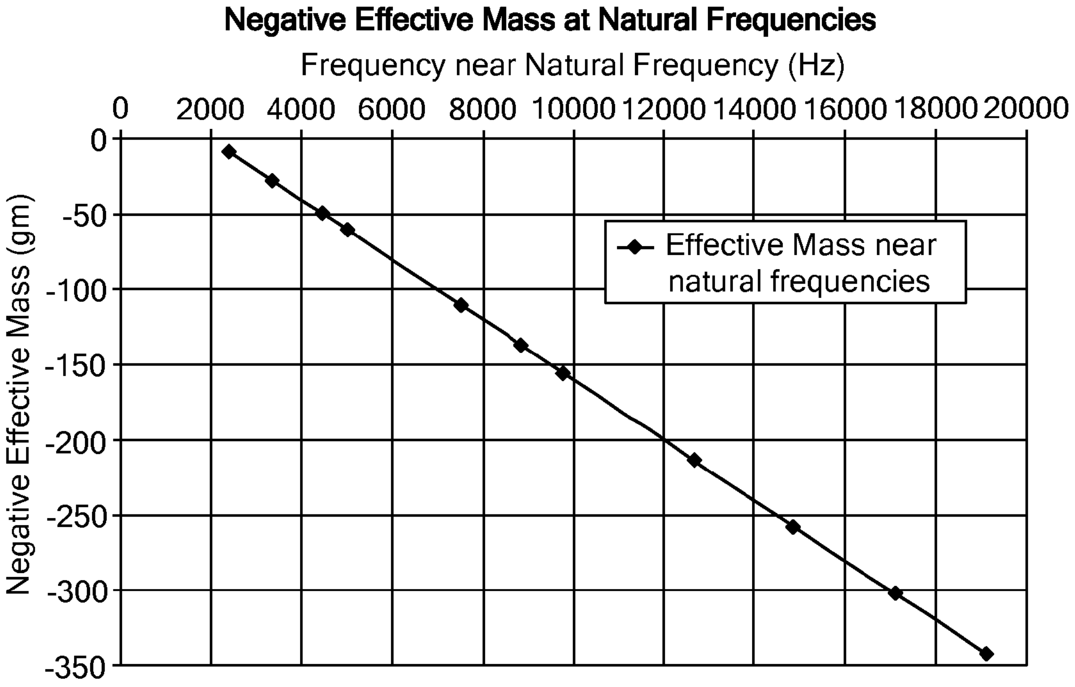
FIG. 8*b* is a chart showing the influence of higher order natural frequencies on effective mass of the metamaterial member of FIG. 1*a*, in accordance with some embodiments of the present disclosure.

FIG. 8*a* is a chart showing the asymptotic nature of effective mass near natural resonant frequencies of the metamaterial member of FIG. 1*a*, in accordance with some embodiments of the present disclosure. FIG. 8*b* is a chart showing the influence of higher order natural frequencies on effective mass of the metamaterial member of FIG. 1*a*, in accordance with some embodiments of the present disclosure. In some embodiments, the effective elastic modulus and/or effective mass density may be negative within particular frequency ranges of the applied vibro-acoustic load. For example, the effective elastic modulus and/or effective mass density may be negative at frequencies near the resonant frequency of an inner mass 18. Examples of natural resonance frequencies around which negative effective mass may occur for the embodiment of FIG. 1*a* are shown in FIGS. 8*a* and 8*b*. Specifically, in the embodiment of FIG. 1*a*, the effective mass $M_{eff}$ of the all the inner masses 18 as a function of frequency ω may be governed generally by the following formula, wherein $M_1$ refers to the mass of the outer mass 12, m refers to the cumulative mass of the stem-mass members 26 (which is largely the mass of the inner masses 18 in embodiments where the mass of each stem 20 is much less than or relatively negligible relative to the inner mass 18), and wherein the natural resonant frequencies may fall, for example, near or about 2350, 3300, 4400, 4950, 6650, 7450, 8800, 9700, 12600, 14800, 17050, and 19050 Hz:

$$M_{eff} = M_1 + \frac{m\omega_0^2}{\omega_0^2 - \omega^2}$$

This formula shows that there is a negative peak for effective mass $M_{eff}$ near each of the natural resonant frequencies.

Figure 9:
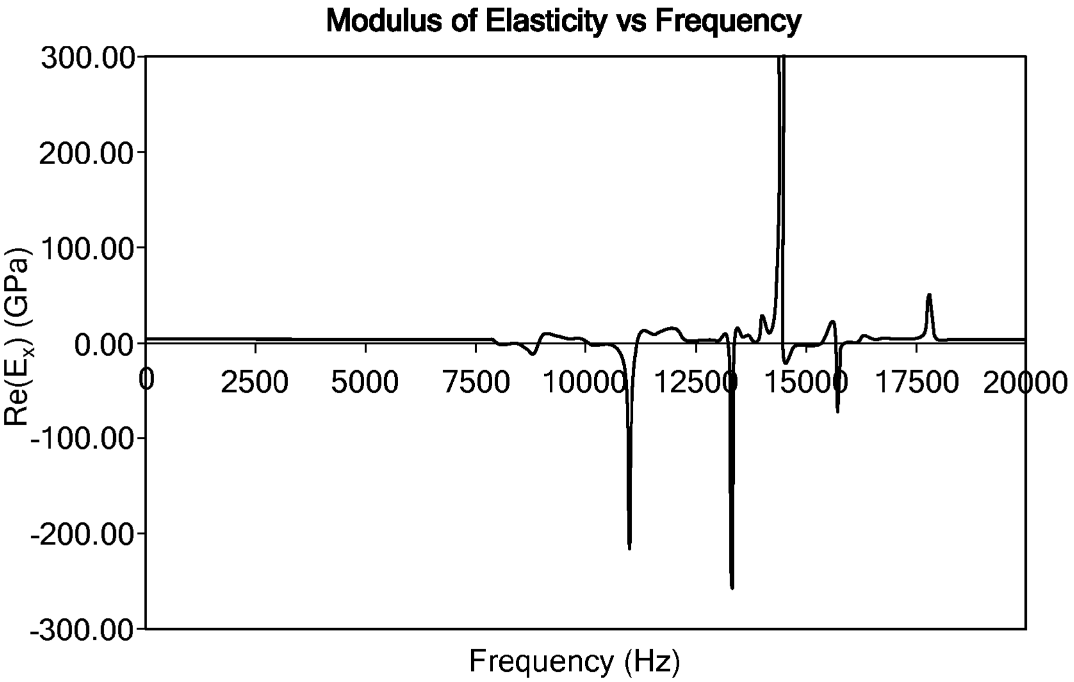
FIG. 9 is a chart showing the variation of the effective elastic modulus of the metamaterial member of FIG. 1*a* over wide range of frequencies, in accordance with some embodiments of the present disclosure.

FIG. 9 is a chart showing the variation of effective elastic modulus of the metamaterial member of FIG. 1*a* over wide range of frequencies. In the embodiment of FIG. 1*a*, the effective elastic modulus of the metamaterial member 10 along the x-direction has been found to have a number of negative peaks, at several natural resonant frequencies, within the range of 7.5 kHz and 16 kHz, as shown in FIG. 9. The negative elastic modulus at these frequencies results in an energy band gap within the metamaterial member 10.

As is known in the art, elastic modulus refers to a mass's tendency, upon applied force, to deform elastically in an elastic deformation region. Although elastic modulus as defined refers broadly to various types of stress-strain relationships (i.e. stress and strain can be measured in a number of ways), more specifically defined elastic moduli include Young's modulus, shear modulus, bulk modulus, Poisson's ration, Lame's first parameter, P-wave modulus, and others. In some embodiments, one or more of these could be negative. Thus, the effective elastic modulus can be said to be negative if any of these quantities are negative. Additionally, each of these moduli can individually be negative for a given metamaterial member. For example, for a given metamaterial member, Young's modulus can be negative, shear modulus can be negative, bulk modulus can be negative, Poisson's ration can be negative, Lame's first parameter can be negative, or P-wave modulus can be negative.

Moreover, the metamaterials with cavities 14 and stems 20, for example in FIGS. 1*a*-1*f*, and the metamaterials with solid outer masses 12, for example in FIGS. 5*a*-6*b*, can be configured to be equivalent systems in that they can have similar functionality and properties relative to each other. For example, these metamaterials can be configured to have similar vibro-acoustic damping properties, including negative effective elastic modulus and negative effective mass density.

Figure 7A:
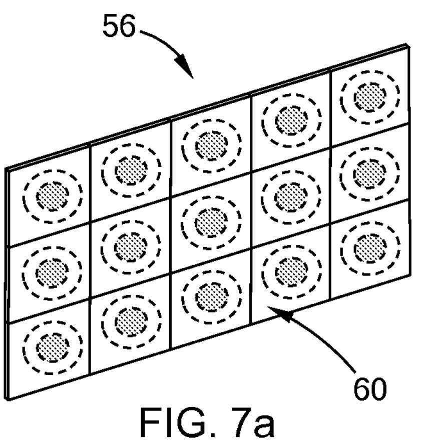
FIG. 7*a* is a perspective view of a two-dimensional modular system of metamaterials members in accordance with some embodiment of the present disclosure.
Figure 7B:
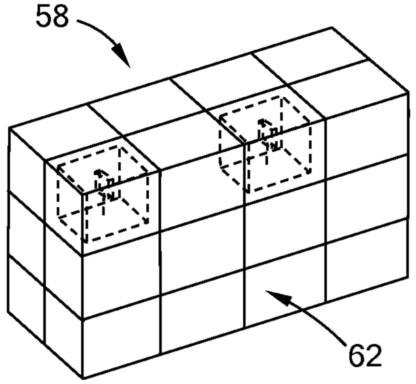
FIG. 7*b* is a perspective view of a three-dimensional modular system of metamaterials members in accordance with some embodiment of the present disclosure.

FIGS. 7*a* and 7*b* illustrates modular systems 56, 58 of metamaterial members 60, 62 for absorbing sound or pressure in accordance with one embodiment of the present disclosure. Specifically, FIG. 7*a* is an example of a two-dimensional modular system (applicable to the metamaterial embodiments of FIGS. 5 and 5*b*, for example), in which each of the outer masses have a single inner mass which has an inner core and outer shell. FIG. 7*b* is an example of a three-dimensional modular system (applicable to the metamaterial embodiments of FIGS. 1*a*-1*f*, 6*a*, and 6*b*, for example), in which the interior of two of the outer masses are shown, each having an a cavity in which a stem-mass member is disposed.

However, the metamaterial members 60, 62 can be any of the metamaterial members discussed earlier. In some embodiments, each of the metamaterial members 60 or 62 in a respective modular system 56 or 58 can be identical. In some of these embodiments, the metamaterial members 60 or 62 can be oriented parallel to each other, in other embodiments, some metamaterial members 60 or 62 can be oriented at 90, 180, or 270 degree angles, in one or more of the x-, y-, or z-directions, with respect to other metamaterial members 60 or 62.

Moreover, different types of metamaterial members discussed earlier can be used in the same modular system 56, 58. For example, some of the metamaterial members 60, 62 can be like those in FIGS. 1*a*-1*f*, while other metamaterial members can be like those in FIGS. 5*a*-6*f*. Moreover, in some embodiments, both two-dimensional and three-dimensional metamaterial members can be used in the same modular system.

The metamaterial member 60 or 62 may be a building block that has different uses. For example, each metamaterial member 60 or 62 may be a building unit, which is attached to other metamaterial members in x-, y-, and/or z-directions to build a larger structure. As discussed earlier, the shapes of the outer masses 12, and thus, the metamaterial members 60, 62, can take on a variety of shapes, including shapes that can be tessellated. For example, squares or cubes can be tessellated to fill up three-dimensional space.

Thus, the metamaterial members 60, 62 could form a system of pulse-absorbing building materials. The system would include multiple outer masses 12, or block masses 12, each having inner masses 18 disposed therein. Each outer mass 12 of the system could be attached to other outer masses 12 and be stacked in the x-, y-, or z-directions. The outer masses 12 could alternatively be placed next to each and/or attached to another structure if desired. For example, the outer masses 12 could be placed within a wall or a helmet.

A sound or pressure pulse emitted on one side of the metamaterial member results in significant damping of the pulse. For example, a layer of metamaterial members 60, 62 may be stacked being a wall. This would result in sound and pressure insulation.

Commercial use of the present invention can include marine structures, including ships, buildings, civil engineering infrastructure, industrial equipment, and sound damping in a wide variety of situations, by way of example. Further, the present invention could be used in military helmets to dampen outside sounds and/or pressures. Likewise, the present invention finds utility in military or other shelters, because the material absorbs dynamic disturbances. Furthermore, it may be desirable to use the inventive material in ship hulls.

While the present invention has been described in terms of preferred embodiments, it will be understood, of course, that the invention is not limited thereto since modifications may be made to those skilled in the art, particularly in light of the foregoing teachings.

It should be understood that the description and specific examples are intended for purposes of illustration only and are not intended to limit the scope of the present disclosure. Further, the drawings described herein are for illustration purposes only and are not intended to limit the scope of the present disclosure in any way.

The invention claimed is:

1. A metamaterial member for absorbing sound or pressure, the metamaterial member comprising:

an outer mass having a cavity formed therein, the outer mass having at least one inner edge defining the boundary of the cavity;

at least one stem disposed within the cavity and extending from the inner edge; and at least one inner mass disposed within the cavity, the inner mass coupled with the stem and configured to undergo dynamic motion upon application of sound or pressure to the outer mass.

2. The metamaterial member of claim 1 wherein the at least one stem is a plurality of stems.

3. The metamaterial member of claim 2 wherein the plurality of stems includes at least three stem that have a periodic arrangement.

4. The metamaterial member of claim 2 wherein the at least one inner mass is a plurality of inner masses, each inner mass of the plurality of inner masses being attached to one stem of the plurality of stems.

5. The metamaterial member of claim 4 wherein each inner mass of the plurality of inner masses is substantially flat or two-dimensional.

6. The metamaterial member of claim 1 wherein a stem-mass member comprises the at least one stem and the at least one inner mass, the stem-mass member being attached to the at least one inner edge at at least two different points.

7. The metamaterial member of claim 1 wherein the at least one inner mass is a plurality of inner masses and the at least one stem is attached to at least two masses of the plurality of masses.

8. The metamaterial member of claim 1 wherein the metamaterial member has a negative effective elastic modulus for at least one range of frequencies of applied load.

9. The metamaterial member of claim 1 wherein the metamaterial member has a negative effective mass for at least one range of frequencies of applied load.

10. The metamaterial member of claim 1 wherein the outer mass is rectangular and the cavity is a rectangular void within the outer mass.

11. The metamaterial member of claim 1 wherein the at least one inner mass comprises an outer shell formed of a first material and an inner core formed of a second material.

12. The metamaterial member of claim 1 wherein each inner mass is substantially flat or two-dimensional and each inner mass has two opposed faces.

13. The metamaterial member of claim 1 wherein the stem is flexible.

14. A system of pulse-absorbing building materials, the system comprising a plurality of identical outer masses, each outer mass having a cavity formed therein, each outer mass having a plurality of stems disposed within the cavity and attached to an inner edge of the outer mass, each outer mass having a plurality of inner masses disposed within the cavity, each inner mass of the plurality inner masses attached to a stem of the plurality of stems and configured to undergo dynamic motion upon application of sound or pressure to the outer mass, wherein the system has at least one of (1) a negative effective elastic modulus for at least one range of frequencies of applied load, or (2) a negative effective mass for at least one range of frequencies of applied load.

15. The system of claim 14 wherein the plurality of inner masses and the plurality of stems are equal in number, each inner mass being attached to a single stem and no other stems.

16. A metamaterial member for absorbing sound or pressure, the metamaterial member comprising:

a solid outer mass that is substantially flat or two-dimensional; and at least one inner mass that is substantially flat or two-dimensional, the at least one inner mass being embedded in the solid outer mass, the at least one inner mass comprising:

an outer shell formed of a first material; and an inner core formed of a second material and configured to undergo dynamic motion upon application of sound or pressure to the outer mass.

17. The metamaterial member of claim 16 wherein the metamaterial member has a negative effective elastic modulus in a frequency range.

18. The metamaterial member of claim 16 wherein the metamaterial member has a negative effective mass in a frequency range.

19. The metamaterial member of claim 16 wherein the at least one inner mass is a plurality of inner masses.

20. The metamaterial member of claim 19 wherein the plurality of inner masses includes at least three inner masses that have a periodic arrangement.

21. The metamaterial member of claim 16 wherein the second material has a greater elastic modulus than the first material.

22. A metamaterial member for absorbing sound or pressure, the metamaterial member comprising:

a solid block mass; and at least one inner mass that is embedded in the solid block mass, the at least one inner mass comprising:

an outer shell formed of a first material; and an inner core formed of a second material and configured to undergo dynamic motion upon application of sound or pressure to the outer mass;

wherein either (1) at least one of the outer shell or the inner core has a non-spherical shape, or (2) the at least one inner mass comprises at least two inner masses that are not identical.

23. The metamaterial member of claim 22 wherein the second material has a greater elastic modulus than the first material.

24. The metamaterial member of claim 22 wherein the system has at least one of (1) a negative effective elastic modulus for at least one range of frequencies of applied load, or (2) a negative effective mass for at least one range of frequencies of applied load.

25. The metamaterial member of claim 22 wherein the outer shell has a substantially cylindrical shape.

26. The metamaterial member of claim 22 wherein the at least one inner mass comprises at least two inner masses that have at least one of different shapes, different sizes, or different materials.

* * * * *